(12) United States Patent
Onda et al.

(10) Patent No.: US 10,762,026 B2
(45) Date of Patent: Sep. 1, 2020

(54) INFORMATION PROCESSING APPARATUS AND CONTROL METHOD FOR SUPPRESSING OBSTACLE

(71) Applicant: FUJITSU LIMITED, Kawasaki-shi, Kanagawa (JP)

(72) Inventors: Naokazu Onda, Kawasaki (JP); Hirotoshi Inoue, Kawasaki (JP); Hiroaki Watanabe, Hamamatsu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/508,363

(22) Filed: Jul. 11, 2019

(65) Prior Publication Data

US 2020/0050572 A1 Feb. 13, 2020

(30) Foreign Application Priority Data

Aug. 7, 2018 (JP) .................................. 2018-148534

(51) Int. Cl.
*G06F 13/40* (2006.01)
*G06F 11/30* (2006.01)
*G06F 13/12* (2006.01)

(52) U.S. Cl.
CPC ...... *G06F 13/4081* (2013.01); *G06F 11/3041* (2013.01); *G06F 13/126* (2013.01)

(58) Field of Classification Search
None
See application file for complete search history.

(56) References Cited

U.S. PATENT DOCUMENTS

2018/0046508 A1* 2/2018 Chou ..................... G06F 9/50
2019/0056773 A1* 2/2019 Xiao ..................... G06F 1/266

FOREIGN PATENT DOCUMENTS

| JP | 62-014499 | 1/1987 |
| JP | 07-028658 | 1/1995 |
| JP | 2000-298628 | 10/2000 |

* cited by examiner

*Primary Examiner* — Scott C Sun
(74) *Attorney, Agent, or Firm* — Fujitsu Patent Center

(57) ABSTRACT

An information processing apparatus includes an interface switching circuit including a first hardware interface to which a first device part is coupled; and a first processor including a second hardware interface, wherein the interface switching circuit is configured to block, when hot-removal of the first device part is detected, a signal path between the first hardware interface and the second hardware interface, and cancel, when diagnosis for a second device part newly hot-inserted in the first hardware interface is completed, the blocking of the signal path in response to a result of the diagnosis, and the first processor is configured to detect presence of the second device part from that the first processor transits from a non-responsive state to a responsible state, and execute an initialization process for the second device part.

10 Claims, 11 Drawing Sheets

INFORMATION PROCESSING APPARATUS AND CONTROL METHOD FOR SUPPRESSING OBSTACLE

CROSS-REFERENCE TO RELATED APPLICATION

This application is based upon and claims the benefit of priority of the prior Japanese Patent Application No. 2018-148534, filed on Aug. 7, 2018, the entire contents of which are incorporated herein by reference.

FIELD

The embodiments discussed herein relate to an information processing apparatus and a control method.

BACKGROUND

At present, various devices are coupled to an information processing apparatus. Some information processing apparatuses include a mechanism that makes it possible, when a device malfunctions or in a like case, to easily replace the drive with an alternative device.

For example, a hot-swap method has been proposed which makes it possible, when expansion or withdrawal of a peripheral electronic circuit board is to be performed, to perform insertion or removal of the peripheral electronic circuit board without turning off the power supply to an apparatus in which the board is incorporated. According to the proposed hot-swap method, an instruction is issued from inputting means to suppress transfer of data from a control board to a peripheral electronic circuit board and place a data bus into a disabled state, and in this condition, a hot-swap of the peripheral electronic circuit board is performed.

Also an online maintenance method has been proposed in which, in the case where a board that occurs an obstacle is replaced by removal and insertion, the newly inserted board itself performs self-diagnosis and notifies the control board of a result of the self-diagnosis and the control board performs failure recovery confirmation based on the self-diagnosis result.

Also a logic card addition method for a common bus system has been proposed in which a plurality of logic cards including a logic card that serves as a bus master are coupled to a bus line in common on a back panel through a connector. According to the proposed addition method, the logic card that serves as the bus master detects that a new logic card is coupled to the common bus during system operation. Thus, the logic card serving as the bus master places bus requests issued from other logic cards including the logic card itself then the new logic card into a standby state and performs a test of the new logic card. Then, only in the case where it is confirmed that the new logic card is normal, the logic card serving as the bus master incorporates the new logic card into the common bus. Examples of the related art include Japanese Laid-open Patent Publication No. S62-14499, Japanese Laid-open Patent Publication No. H7-28658, and Japanese Laid-open Patent Publication No. 2000-298628.

A device part newly coupled to an information processing apparatus sometimes occurs an initial failure. If a device part having some initial failure is incorporated into an information processing apparatus by a hot-replacement, an access error to the device part arising from the initial failure sometimes occurs during practical use of the information processing apparatus after the replacement of the device part, resulting in degradation of the performance of the information processing apparatus.

In this connection, it is conceivable, for example, that a self-diagnosis result of a newly inserted board is confirmed by a control board as in the proposal described above or that a logic card that becomes a bus master performs a test of a new logic card. However, in the method of the proposal, communication between the newly inserted board and the control board through the common bus or communication between the new logic card and the logic card that becomes a bus master occurs. Therefore, there is the possibility that the communication may have an influence on an existing device part. From the foregoing, preferably it is possible to suppress an obstacle when a hot-replacement of a device part is performed.

SUMMARY

According to an aspect of the embodiment, an information processing apparatus includes an interface switching circuit including a first hardware interface to which a first device part is coupled; and a first processor including a second hardware interface, wherein the interface switching circuit is configured to block, when hot-removal of the first device part is detected, a signal path between the first hardware interface and the second hardware interface, and cancel, when diagnosis for a second device part newly hot-inserted in the first hardware interface is completed, the blocking of the signal path in response to a result of the diagnosis, and the first processor is configured to detect presence of the second device part from that the first processor transits from a non-responsive state to a responsible state, and execute an initialization process for the second device part.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the following, embodiments are described with reference to the drawings.

First Embodiment

A first embodiment is described.

Figure 1:
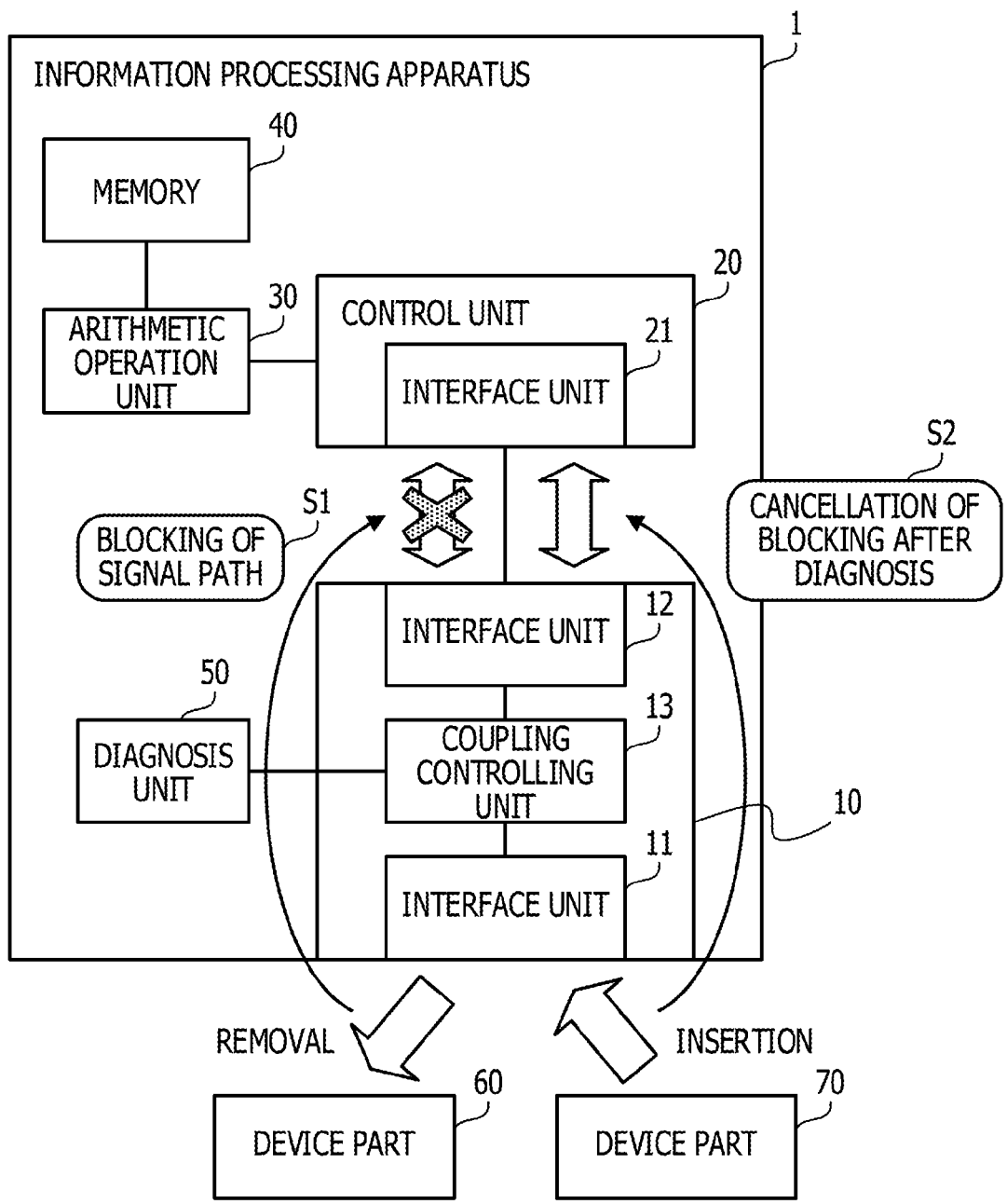
FIG. 1 is a view depicting an information processing apparatus of a first embodiment.

FIG. 1 is a view depicting an information processing apparatus of the first embodiment.

An information processing apparatus 1 includes an interface switching unit 10, a control unit 20, an arithmetic operation unit 30, a memory 40, and a diagnosis unit 50. In the information processing apparatus 1, a hot-replacement of a device part 60 is possible. The hot-replacement signifies that, in a state in which the information processing apparatus 1 is operative, the device part 60 may be replaced with a new (alternative) device part 70. For example, a user of the information processing apparatus 1 may perform a work for replacing the device part 60 with the device part 70 while the information processing apparatus 1 is kept operative. To remove the device part 60 from the information processing apparatus 1 while the information processing apparatus 1 is in an operative state is sometimes referred to as hot-removal or hot-pullout. To mount the device part 70 on the information processing apparatus 1 while the information processing apparatus 1 is in an operative state is sometimes referred to as hot-insertion.

As the device parts 60 and 70, storage devices such as a hard disk drive (HDD) or a solid state drive (SSD) are applicable. The device parts 60 and 70 may be devices of other types such as a network adapter or a random access memory (RAM).

The interface switching unit 10 is interposed between the device part 60 (or the device part 70) and the control unit 20 and relays a signal between the device part 60 (or the device part 70) and the control unit 20. The interface switching unit 10 is coupled also to the diagnosis unit 50. The interface switching unit 10 sometimes relays a signal between the device part 60 and the diagnosis unit 50. The interface switching unit 10 includes interface units 11 and 12 and a coupling controlling unit 13.

The interface unit 11 is coupled to the device part 60 or the device part 70. For example, the interface unit 11 and the device parts 60 and 70 individually include a connector for coupling. The interface unit 11 and the device part 60 (or the device part 70) are coupled to each other by coupling the connector of the former and the connector of the latter directly to each other or through a given cable.

The interface unit 12 is coupled to an interface unit 21 of the control unit 20. Each of the interface units 12 and 21 includes a connector for coupling. The interface unit 12 and the interface unit 21 are coupled to each other by direct coupling or coupling through a given table between the connector of the interface unit 12 and the connector of the interface unit 21.

The coupling controlling unit 13 controls blocking and cancellation of the blocking of the signal path between the interface units 12 and 21. Further, the coupling controlling unit 13 controls switching between the signal path between the interface units 11 and 12 and the signal path between the interface unit 11 and the diagnosis unit 50.

The control unit 20 performs linkup (process for enabling communication) and incorporation into the information processing apparatus 1 of the device parts 60 and 70. Thereafter, the control unit 20 accepts an access request to the device parts 60 and 70 from the arithmetic operation unit 30 and performs access to the device part 60 or 70. The control unit 20 includes an interface unit 21. The interface unit 21 provides an interface for coupling to the interface unit 12 as described above. A plurality of interface units 21 may be provided in the control unit 20.

The arithmetic operation unit 30 executes a program of software stored in the memory 40. The arithmetic operation unit 30 is, for example, a central processing unit (CPU). The arithmetic operation unit 30 outputs an access request to the device part 60 or 70 incorporated already in the information processing apparatus 1 to the control unit 20 in response to the process of the software. Further, if presence of the device part 70 is detected by interrupt from the control unit 20 after hot-replacement from the device part 60 to device part 70 is performed, the arithmetic operation unit 30 instructs the control unit 20 to perform an initialization process for the device part 70.

The memory 40 stores a program of software to be executed by the arithmetic operation unit 30. The memory 40 is, for example, a RAM.

The diagnosis unit 50 diagnoses whether or not operation of the device part 70 newly hot-inserted in the interface unit 11 is normal. The diagnosis unit 50 notifies the coupling controlling unit 13 of a result of the diagnosis. The diagnosis result includes information of whether operation of the device part 70 is normal or abnormal. In the case where the diagnosis result of the device part 70 indicates normality, this signifies that the device part 70 has no initial failure (or may have some initial failure but with low possibility). In the case where the diagnosis result of the device part 70 indicates abnormality, this signifies that the device part 70 has some initial failure (or may have some initial failure with high possibility).

The information processing apparatus 1 may further include a notification unit such as a light emitting diode (LED) for notifying the user of the information processing apparatus 1 that the diagnosis result by the diagnosis unit 50 indicates normality or abnormality. It is conceivable that the diagnosis unit 50 controls the notification unit to notify the user of the diagnosis result of the device part 70.

In the following, a case is considered in which the device part 60 is replaced with the device part 70 from a failure such as malfunction of the device part 60 from a state in which the device part 60 is coupled to the interface unit 11. In a stage before the device part 60 is hot-removed, the coupling controlling unit 13 couples the interface units 11 and 12.

The coupling controlling unit 13 detects the hot-removal of the device part 60 from the interface unit 11. Consequently, the coupling controlling unit 13 blocks the signal path between the interface unit 11 and the interface unit 21 (S1).

For example, the coupling controlling unit 13 notifies the control unit 20 of the hot-removal of the device part 60 by compulsorily stopping signal transfer between the interface unit 12 and the interface unit 21. The coupling controlling unit 13 may perform compulsory stopping of the signal transfer, for example, by changing a setting of a given control register for controlling operation of a transmission/reception driver of the interface unit 12. By this compulsory stopping, the interface switching unit 10 transits from a responsible state to a non-responsive state to the control unit 20. Then, the coupling controlling unit 13 performs switching from the path between the interface units 11 and 12 (path in the inside of the interface switching unit 10) to the path between the interface unit 11 and the diagnosis unit 50.

The coupling controlling unit 13 detects hot-insertion of the device part 70 into the interface unit 11. Then, the coupling controlling unit 13 transmits a given signal transmitted thereto from the device part 70 to the diagnosis unit 50 through an internal path. Here, the coupling controlling unit 13 may perform a given initialization process for enabling communication for allowing diagnosis by the diagnosis unit 50 for the device part 70. Consequently, the diagnosis unit 50 detects the coupling of the device part 70 to the interface unit 11 and performs diagnosis of the device part 70. The coupling controlling unit 13 acquires a result of the diagnosis (diagnosis result) by the diagnosis unit 50.

The coupling controlling unit 13 detects hot-insertion of the device part 70 and maintains a state in which signal transfer through the signal path between the interface units 12 and 21 is compulsorily stopped also while diagnosis is being performed by the diagnosis unit 50.

If the diagnosis for the device part 70 newly hot-inserted in the interface unit 11 is completed, the coupling controlling unit 13 cancels the blocking of the signal path between the interface unit 11 and the interface unit 21 in response to the diagnosis result (S2).

For example, in the case where the diagnosis result of the device part 70 is normal, the coupling controlling unit 13 performs switching from the path between the interface unit 11 and the diagnosis unit 50 to the path between the interface units 11 and 12. Then, the coupling controlling unit 13 cancels the compulsory stopping of signal transfer between the interface units 12 and 21. The coupling controlling unit 13 cancels the compulsory stopping of signal transfer, for example, by changing the setting of the given control register for controlling operation of the transmission/reception driver of the interface unit 12 such that signal transfer between the interface units 12 and 21 is re-started. Consequently, the interface switching unit 10 transits from a non-responsive state to a responsible state to the control unit 20. The coupling controlling unit 13 may reset the interface unit 12 in order to transmit a given signal upon novel device coupling from the interface unit 12 to the interface unit 21.

The control unit 20 detects presence of the device part 70 from the transition of the interface switching unit 10 from a non-responsive state to a responsible state. For example, the control unit 20 detects presence of the newly hot-inserted device part 70 by receiving a given signal outputted from the interface unit 12. The control unit 20 generates an interrupt for notifying the arithmetic operation unit 30 of the hot-insertion of the device part 70. If the arithmetic operation unit 30 detects presence of the device part 70 by the interrupt, it notifies the control unit 20 of an initialization instruction of the device part 70. The control unit 20 receives the initialization instruction of the device part 70 from the arithmetic operation unit 30. The control unit 20 executes an initialization process for the second device part (for example, a linkup and a process for incorporation into the information processing apparatus 1) in accordance with the initialization instruction. In this manner, an access request to the device part 70 through the control unit 20 by the arithmetic operation unit 30 is enabled.

On the other hand, in the case where the diagnosis result of the device part 70 indicates abnormality, the coupling controlling unit 13 maintains the blocking of the signal path between the interface units 11 and 21. For example, the coupling controlling unit 13 maintains the path between the interface unit 11 and the diagnosis unit 50 and maintains the compulsory stopping state of signal transfer between the interface units 12 and 21. Consequently, if the device part 70 has an initial failure, the presence of the device part 70 is not detected by the control unit 20. The user of the information processing apparatus 1 may grasp the abnormality of the device part 70 from the notification unit described hereinabove and replace the device part 70 with an alternative device part.

According to the information processing apparatus 1, if hot-removal of the device part 60 from the interface unit 11 is detected by the interface switching unit 10, the signal path between the interface unit 11 and the interface unit 21 is blocked. If the diagnosis for the device part 70 newly hot-inserted in the interface unit 11 is completed, the blocking of the signal path is cancelled in response to a result of the diagnosis. From the transition from a non-responsive state to a responsible state of the interface switching unit 10, presence of the device part 70 is detected and an initialization process for the device part 70 is executed by the control unit 20.

Consequently, an obstacle in the case where the device part 60 is hot-replaced with the device part 70 may be suppressed. For example, before the diagnosis, the interface switching unit 10 blocks the signal path to the control unit 20 such that it does not allow the control unit 20 to participate in the diagnosis. Therefore, the influence of the diagnosis upon the control unit 20 and the arithmetic operation unit 30 and the influence upon the control unit 20 and the arithmetic operation unit 30 in case of the device part 70 occurs an initial failure may be suppressed. Further, upon diagnosis or when an initial failure exists, the influence of this upon the other device parts coupled to the control unit 20 and different kinds of device parts coupled to the internal bus to which the control unit 20 is coupled may be suppressed.

For example, the interface switching unit 10 enables detection of the device part 70 by the control unit 20 in the case where it is decided by the diagnosis that the device part 70 is normal. On the other hand, in the case where it is decided by the diagnosis that the device part 70 is abnormal, the interface switching unit 10 suppresses detection of the device part 70 by the control unit 20. This makes it possible to incorporate only the device part 70, which is free from an initial failure (or is low in possibility of an initial failure), into the information processing apparatus 1, and the possibility that performance deterioration of the information processing apparatus 1 arising from an initial failure of the device part 70 may occur after the incorporation may be reduced.

The information processing apparatus 1 is, for example, a computer of a storage apparatus, a server apparatus, or a client apparatus that provides a storage area of a large capacity. In the following, functions of the information processing apparatus 1 are described in detail where a server apparatus is an example of the information processing apparatus 1.

Second Embodiment

Now, a second embodiment is described.

Figure 2:
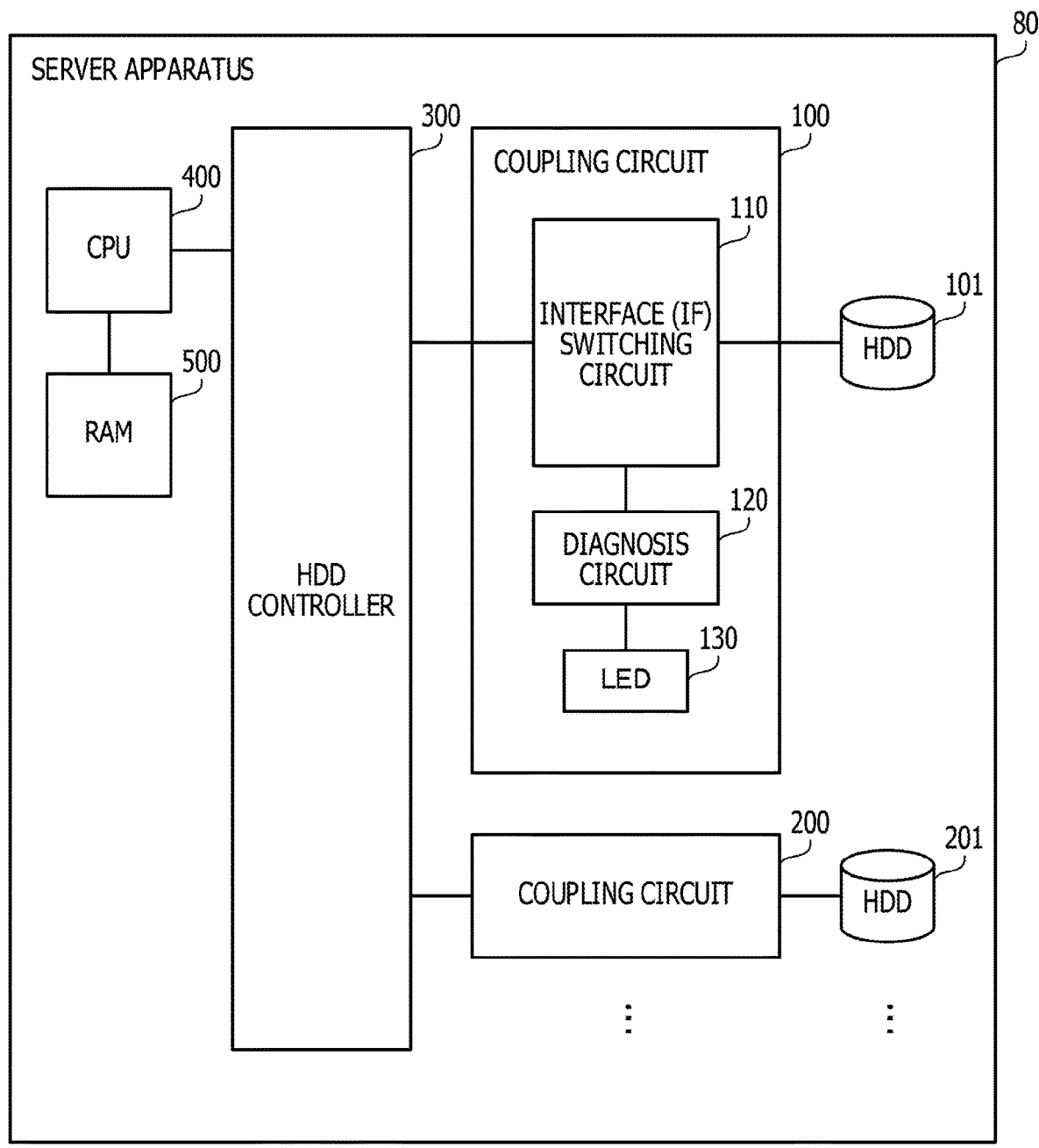
FIG. 2 is a block diagram depicting an example of hardware of a server apparatus of a second embodiment.

FIG. 2 is a block diagram depicting an example of hardware of a server apparatus of the second embodiment.

A server apparatus 80 includes coupling circuits 100, 200, . . . , HDDs 101, 102, . . . , an HDD controller 300, a CPU 400, and a RAM 500.

The coupling circuit 100 is coupled to the HDD controller 300. The HDD 101 is coupled to the coupling circuit 100. The coupling circuit 100 includes an interface (IF) switching circuit 110, a diagnosis circuit 120, and an LED 130.

The IF switching circuit 110 is interposed between the HDD 101 and the HDD controller 300 and relays a signal between the HDD 101 and the HDD controller 300. The IF switching circuit 110 is coupled also to the diagnosis circuit 120. The IF switching circuit 110 sometimes relays a signal between the HDD 101 and the diagnosis circuit 120. Here, as an example of coupling between the IF switching circuit 110 and the HDD 101 and interfacing between the IF switching circuit 110 and the HDD controller 300, a serial advanced technology attachment (SATA) is considered.

The IF switching circuit 110 is an example of the interface switching unit 10 of the first embodiment. The HDD 101 is an auxiliary storage device of the server apparatus 80 and is an example of the device part 60 in the first embodiment.

The diagnosis circuit 120 performs diagnosis of operation of an HDD hot-inserted in the HDD 101 or the coupling circuit 100. The diagnosis circuit 120 notifies the IF switching circuit 110 of a result of the diagnosis. Further, the diagnosis circuit 120 causes the LED 130 provided on the server apparatus 80 to emit light in response to a result of the diagnosis to notify the user of the server apparatus 80 of the result of the diagnosis. The diagnosis circuit 120 is an example of the diagnosis unit 50 in the first embodiment.

The LED 130 emits light under the control of the diagnosis circuit 120. For example, the LED 130 may include a plurality of LEDs including an LED that emits light in the case where the result of the diagnosis by the diagnosis circuit 120 indicates normality and an LED that emits light when the result of the diagnosis indicates abnormality. Alternatively, the LED 130 may notify of a plurality of results of diagnosis using a single LED by changing the color of light emission in response to the result of diagnosis.

Also the other coupling circuits including the coupling circuit 200 include an IF switching circuit, a diagnosis circuit, and an LED similarly to the coupling circuit 100. Although the following description is directed principally to the coupling circuit 100, also the other coupling circuits have functions similar to those of the coupling circuit 100. One HDD is inserted in one coupling circuit. For example, the coupling circuit 200 has an HDD 201 coupled thereto.

The HDD controller 300 is coupled to the CPU 400 through an internal bus of the server apparatus 80. The HDD controller 300 performs access control to the HDDs 101, 201, . . . for writing or reading out of data and so forth in accordance with an access request by the CPU 400. Further, the HDD controller 300 performs an initialization process for the HDDs 101, 201, . . . in accordance with an instruction of the CPU 400. The initialization process is a given procedure (initialization sequence) in the SATA including, for example, linkup of the HDDs 101, 201, . . . and incorporation of the HDDs 101, 201, . . . into the server apparatus 80 (in the case where a different standard is used, a procedure in compliance with the standard). The HDD controller 300 is an example of the control unit 20 of the first embodiment.

The CPU 400 executes a program of software such as an operating system (OS) or an application of the server apparatus 80. The program is stored into the RAM 500. The CPU 400 is coupled to the HDD controller 300 and the RAM 500 through the internal bus of the server apparatus 80. The CPU 400 is an example of the arithmetic operation unit 30 in the first embodiment.

The RAM 500 is a main storage device of the server apparatus 80. The RAM 500 stores a program to be executed by the CPU 400 and data used in processing of the CPU 400. The RAM 500 is an example of the memory 40 in the first embodiment.

To the internal bus of the server apparatus 80, also different kinds of device parts are coupled (not depicted) such as an image signal processing unit coupled to a display, an input signal processing unit coupled to inputting devices such as a mouse and a keyboard, a communication processing unit for coupling for communication to a network.

Here, the server apparatus 80 allows hot-replacement of an HDD. For example, in the case where the HDD 101 fails, the user of the server apparatus 80 may perform a work for replacing the HDD 101 with an alternative HDD in a state in which the server apparatus 80 is kept operative.

However, alternative HDDs include initial defective products at a certain rate. Initial defects include, in addition to a defect existing already upon shipment from a factory, a defect (failure) arising from electrostatic breakdown that occurs during transportation from a part center in which repair parts are stored to the server apparatus 80, when opening, or upon incorporation and so forth.

As access errors arising from an initial defect of an HDD, for example, there are a cyclic redundancy check (CRC) error, an interface error represented by invalid Character, an HDD internal error represented by a media error or a cache error and so forth. If an HDD having such an initial error is incorporated into the server apparatus 80, an access error by the CPU 400 occurs after the incorporation, which sometimes results in deterioration of the system performance by frequent retries or, in the worst case, results in system shutdown.

Therefore, the coupling circuit 100 provides a function for suppressing system shutdown arising from an initial failure of a hot-inserted HDD.

Figure 3:
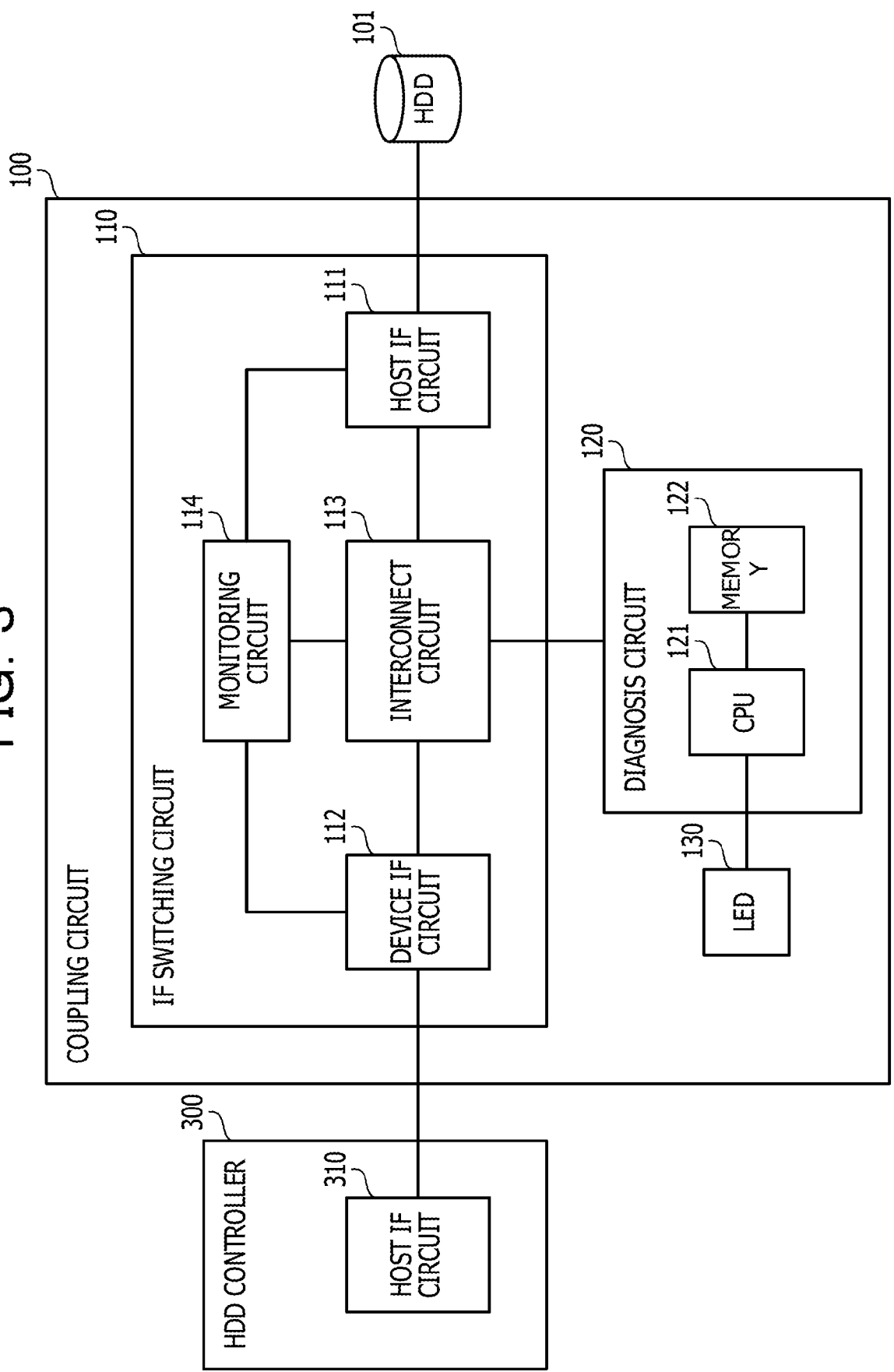
FIG. 3 is a block diagram depicting an example of hardware of a coupling circuit.

FIG. 3 is a block diagram depicting an example of hardware of a coupling circuit.

The IF switching circuit 110 includes a host IF circuit 111, a device IF circuit 112, an interconnect circuit 113, and a monitoring circuit 114.

The host IF circuit 111 is an SATA interface (SATA interface on the device side) coupled to the HDD 101. The host IF circuit 111 includes an adapter for coupling to the HDD 101 directly or through a cable.

The device IF circuit 112 is an SATA interface (SATA interface on the host side) coupled to a host IF circuit 310 of the HDD controller 300. The device IF circuit 112 includes an adapter for coupling to the host IF circuit 310 directly or through a cable.

The interconnect circuit 113 is a relay circuit that is used for switching between a path that couples the host IF circuit 111 and the device IF circuit 112 to each other and a path that couples the host IF circuit 111 and the diagnosis circuit 120 to each other.

The monitoring circuit 114 is coupled to the host IF circuit 111, the device IF circuit 112, and the interconnect circuit 113. Further, the monitoring circuit 114 is coupled to the diagnosis circuit 120 through the interconnect circuit 113. The monitoring circuit 114 monitors a notification from the host IF circuit 111 and the device IF circuit 112 and performs state change of the device IF circuit 112, path switching control by the interconnect circuit 113, acquisition of a diagnosis result by the diagnosis circuit 120 and so forth in response to the notification.

The diagnosis circuit 120 includes a CPU 121 and a memory 122. The diagnosis circuit 120 performs path switching of the interconnect circuit 113 in response to an instruction of the monitoring circuit 114.

The CPU 121 performs diagnosis of operation of an HDD newly coupled to the host IF circuit 111. The CPU 121 controls light emission of the LED 130 in response to a diagnosis result.

The memory 122 stores data to be used for diagnosis of operation of an HDD by the CPU 121. The host IF circuit 111 and the device IF circuit 112 individually include a direct memory address (DMA) controller and may perform writing and reading out of data into and from the memory 122.

For example, the CPU 121 performs a diagnosis process of the HDD 101 by performing writing of test data into the HDD 101, reading out of the test data from the HDD 101 and so forth using the host IF circuit 111 and confirming whether the HDD 101 performs expected operation. The host IF circuit 111 stores a diagnosis result including a writing result and a reading out result of test data into and from the memory 122. The CPU 121 outputs the diagnosis result stored in the memory 122 to the monitoring circuit 114. The monitoring circuit 114 performs switching instruction of a path of the interconnect circuit 113 and updating of the state of the device IF circuit 112 in response to the diagnosis result.

The HDD controller 300 includes a host IF circuit 310. The host IF circuit 310 is an SATA interface coupled to the device IF circuit 112. As described hereinabove, a plurality of coupling circuits are coupled to the HDD controller 300. Therefore, the HDD controller 300 includes a plurality of host IF circuits.

Since the host IF circuit 310 is an SATA interface same as the host IF circuit 111, also it is possible to couple the HDD 101 directly to the host IF circuit 310. However, the server apparatus 80 is different from the configuration, in which the HDD controller 300 and the HDD 101 are coupled directly to each other, in that the coupling circuit 100 is provided between the HDD controller 300 and the HDD 101.

Figure 4:
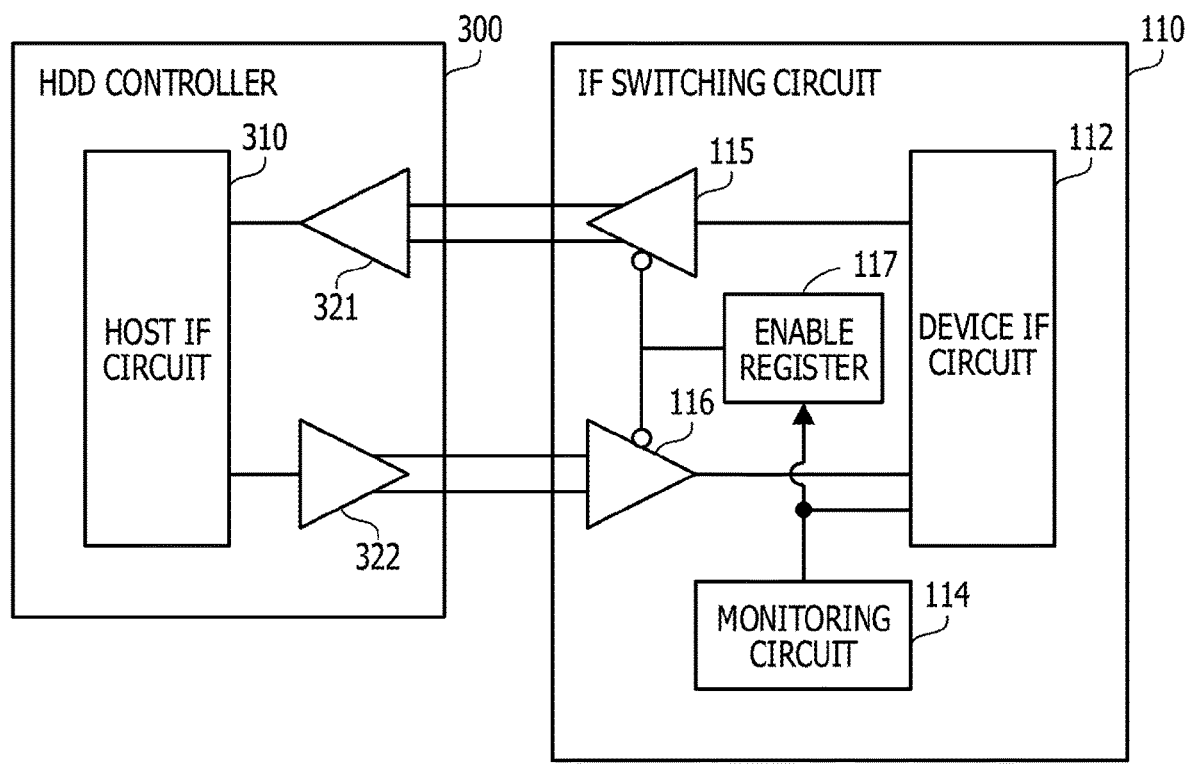
FIG. 4 is a view depicting an example of coupling between an IF switching circuit and an HDD controller.

FIG. 4 is a view depicting an example of coupling between an IF switching circuit and an HDD controller.

The IF switching circuit 110 includes drivers 115 and 116 and an enable register 117 in addition to the circuit exemplified in FIG. 3.

The driver 115 is a transmission driver (output buffer) that transmits a signal (differential signal) to the HDD controller 300. The driver 116 is a reception driver (input buffer) that receives a signal from the HDD controller 300. The drivers 115 and 116 are coupled to the device IF circuit 112.

The enable register 117 is a register for controlling operation of the drivers 115 and 116. For example, in the case where the enable register 117 is ON, the drivers 115 and 116 are enabled for transmission and reception of a signal. In the case where the enable register 117 is OFF, the drivers 115 and 116 are disabled for transmission and reception of a signal. The device IF circuit 112 (or the monitoring circuit 114) may compulsorily stop signal transmission and reception by the drivers 115 and 116 by changing the setting of the enable register 117 from ON to OFF. The device IF circuit 112 (or the monitoring circuit 114) may cancel the compulsory stopping of signal transmission and reception by the drivers 115 and 116 by changing the setting of the enable register 117 from OFF to ON.

The HDD controller 300 further includes drivers 321 and 322. The driver 321 is a reception buffer (input buffer) that receives a signal from the driver 115. The driver 322 is a transmission buffer (output buffer) that transmits a signal to the driver 116. The drivers 321 and 322 are coupled to the host IF circuit 310.

Figure 5A:
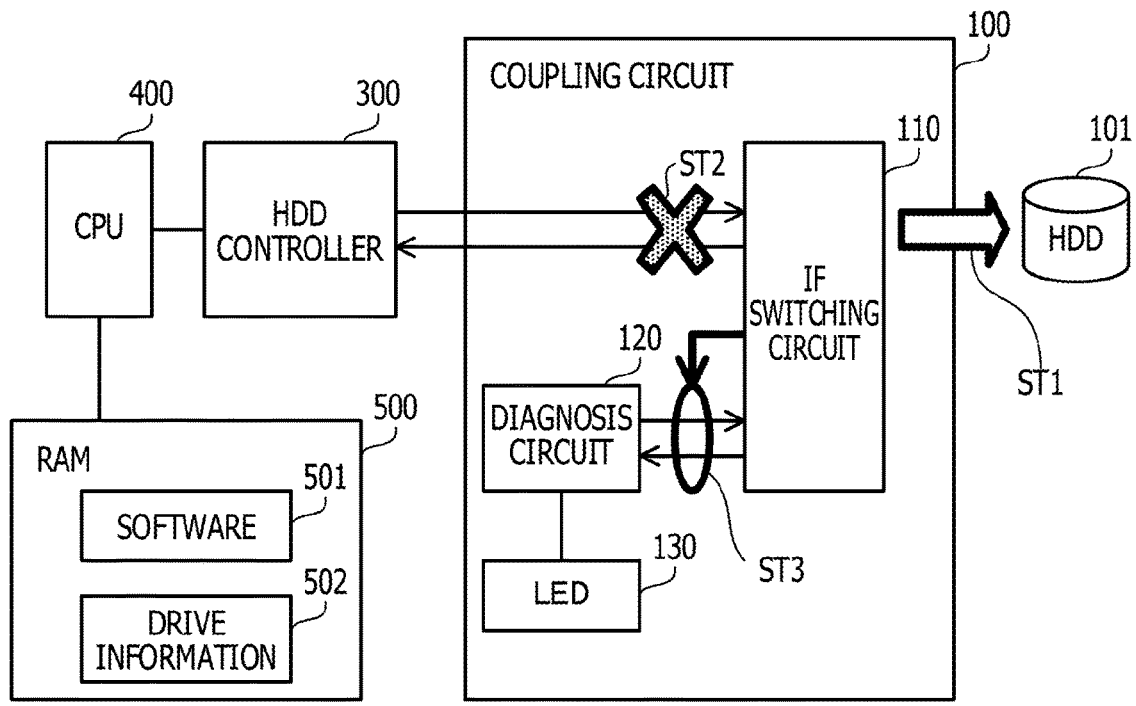
FIGS. 5A and 5B are views depicting examples of control of a coupling circuit.
Figure 5B:
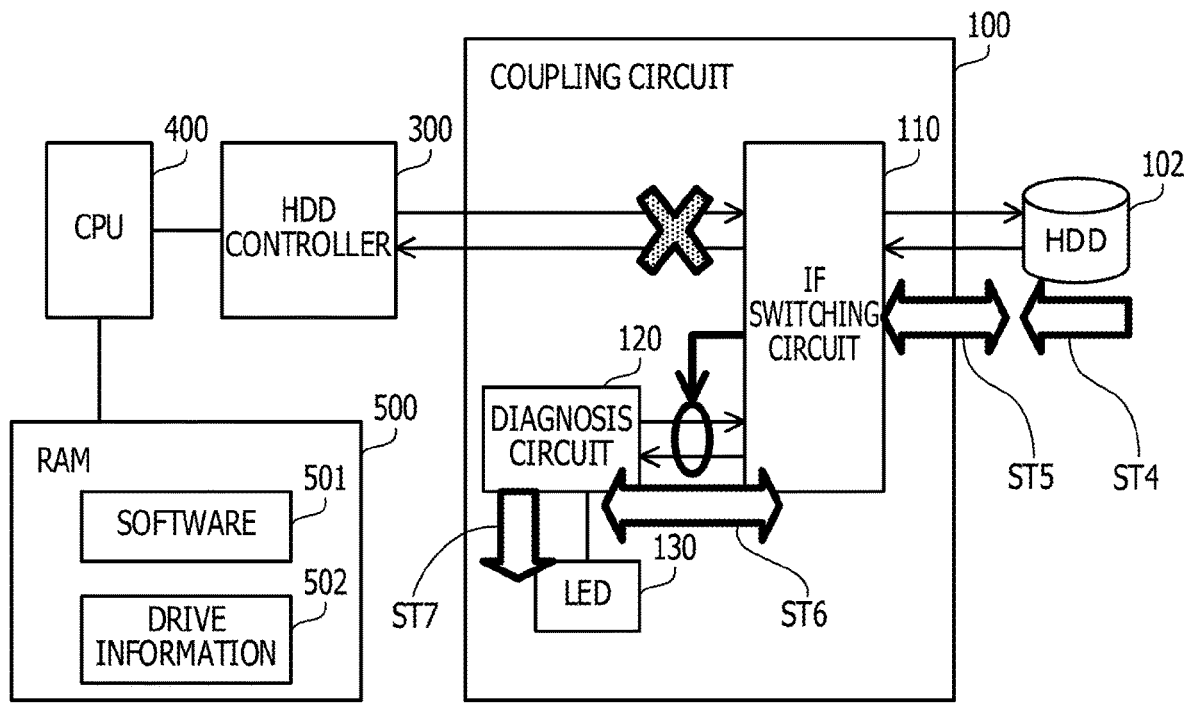

FIGS. 5A and 5B are views depicting examples of control of a coupling circuit.

The RAM 500 has stored therein software 501 for accessing the HDD 101 to perform processing and drive information 502 including information relating to HDDs coupled as a subordinate to the HDD controller 300. A case is considered in which abnormality occurs with the HDD 101 due to a malfunction of the HDD 101.

First, the CPU 400 detects abnormality of the HDD 101 by a function of the software 501. Along with this, the CPU 400 executes link down and decoupling processes for the HDD 101 by setting "0h" to a control register (for example, "Device Detect Initialize" value) existing in the inside of the host IF circuit 310 of the HDD controller 300. By the decoupling process, the HDD controller 300 recognizes this as a state in which the HDD 101 with which the abnormality has occurred is logically decoupled. However, in this stage, the HDD 101 is in a physically coupled state, and a status information register (for example, a "Device Detect" value) held in the inside of the host IF circuit 310 is in a state (value) that indicates the presence of the HDD 101.

Further, by the link down and decoupling processes of the HDD 101 described above, a status information register (for example, a "Host Detect" value) held in the inside of the device IF circuit 112 of the IF switching circuit 110 is set to a value indicative of a logically decoupled state of the HDD 101. Consequently, the IF switching circuit 110 notifies the monitoring circuit 114 that the HDD 101 has been placed into a logically decoupled state.

After the monitoring circuit 114 accepts the notification, it waits until it accepts a notification indicating that the status information register (for example, the "Device Detect" value) held in the inside of the host IF circuit 111 has become a value corresponding to the physically decoupled state of the HDD 101. A state in which hot-removal of the HDD 101 is possible is established in this manner.

FIG. 5A depicts an example of control upon hot-removal of the HDD 101.

The user of the server apparatus 80 would hot-remove the HDD 101. Consequently, the HDD 101 is removed from the coupling circuit 100 (ST1). Thus, the host IF circuit 111 sets the status information register in the inside of the host IF circuit 111 to a value indicative of the physically decoupled state. The host IF circuit 111 notifies the monitoring circuit 114 that the physically decoupled state is established.

The monitoring circuit 114 accepts the notification of the physically decoupled state from the host IF circuit 111 and recognizes an HDD non-mounted state in the IF switching circuit 110. Consequently, the monitoring circuit 114 notifies the device IF circuit 112 of the physically decoupled state.

The device IF circuit 112 accepts the notification of the physically decoupled state from the monitoring circuit 114. The device IF circuit 112 sets the enable register 117 of the drivers 115 and 116 (input/output (IO) buffers) of the physical layer (PHY) to which the device IF circuit 112 is coupled from ON to OFF in response to the notification. For example, transmission and reception of a signal to and from the HDD controller 300 are stopped compulsorily, and the coupling circuit 100 is placed into a non-responsive state to the HDD controller 300 and the coupling circuit 100 is placed into a non-responsive state to the HDD controller 300. The setting change of the enable register 117 from ON to OFF may be performed by the monitoring circuit 114 as described hereinabove. The compulsory stop of signal transmission and reception by the device IF circuit 112 makes a notification of hot-removal of the HDD 101 to the HDD controller 300 (ST2).

By the process in ST2, signal transmission and reception between the host IF circuit 310 and the device IF circuit 112 through the drivers 115 and 321 and the drivers 116 and 322 are stopped compulsorily. Further, the status information register in the inside of the host IF circuit 310 is set to the value indicative of the physically decoupled state of the HDD 101. Consequently, the HDD controller 300 detects the hot-removal (HDD non-mounted state).

The monitoring circuit 114 notifies the diagnosis circuit 120 that signal transmission and reception between the host IF circuit 310 and the device IF circuit 112 have been compulsorily stopped. After the diagnosis circuit 120 accepts the notification, it switches the path that couples the host IF circuit 111 and the device IF circuit 112 in the interconnect circuit 113 to each other to a path that couples the diagnosis circuit 120 and the host IF circuit 111 to each other (ST3). The path switching of the interconnect circuit 113 may be performed by the monitoring circuit 114.

Further, the monitoring circuit 114 notifies the diagnosis circuit 120 that the status information register held in the inside of the host IF circuit 111 indicates the physically decoupled state. After the diagnosis circuit 120 accepts the notification, it enters and holds a state in which it waits until a value indicating that the status information register held in the inside of the host IF circuit 111 is set to a physically coupled state.

FIG. 5B depicts an example of control upon hot-insertion of the HDD 102.

The user of the server apparatus 80 would hot-insert the HDD 102 that is an alternative of the HDD 101. Consequently, the HDD 102 is attached to the coupling circuit 100 (ST4). Hereupon, the power supply to the HDD 102 is turned ON. The HDD 102 transmits a given packet indicating that the HDD 102 exists as a device to the host IF circuit 111. The packet is transmitted continuously from the HDD 102. The packet is received by the host IF circuit 111. The status information register of the host IF circuit 111 is set to a value indicative of a physically coupled state of the HDD 102.

The monitoring circuit 114 detects that the status information register of the host IF circuit 111 has been set to the value indicative of the physically coupled state of the HDD 102. Hereupon, the monitoring circuit 114 notifies the diagnosis circuit 120 of the hot-insertion of the HDD 102. Although the hot-insertion of the HDD 102 is detected by the monitoring circuit 114, the monitoring circuit 114 maintains the enable register 117 in the OFF state. For example, the monitoring circuit 114 continues to notify the HDD controller 300 of the HDD non-mounted state by maintaining the state of the compulsory stopping of signal transmission and reception to and from the HDD controller 300.

The monitoring circuit 114 instructs the host IF circuit 111 of an initialization sequence of the host IF circuit 111. The host IF circuit 111 executes an initialization sequence of SATA-IF to the HDD 102 in accordance with the instruction and notifies the monitoring circuit 114 of an execution result (ST5). The monitoring circuit 114 notifies the diagnosis circuit 120 of an execution result (normal end) of the initialization sequence received from the host IF circuit 111.

When the CPU 121 receives the normal end notification of the initialization sequence, it deploys test data of the HDD 102 into the memory 122 and instructs the host IF circuit 111 to start diagnosis through the interconnect circuit 113. When the host IF circuit 111 accepts the diagnosis starting instruction, it reads out the test data for the HDD 102 stored in the memory 122 and performs diagnosis of operation of the HDD 102 (for example, a check of reading and writing of the test data). When the diagnosis of the HDD 102 is completed, the host IF circuit 111 stores a result of the diagnosis of the HDD 102 into the memory 122 and notifies the CPU 121 of the diagnosis completion (ST6).

The CPU 121 analyzes the diagnosis result (normal or abnormal) stored in the memory 122 and controls the light emission of the LED 130 in response to the diagnosis result to notify the user of the server apparatus 80 of the diagnosis result (ST7). Further, the CPU 121 notifies the monitoring circuit 114 of the diagnosis result.

Figure 6A:
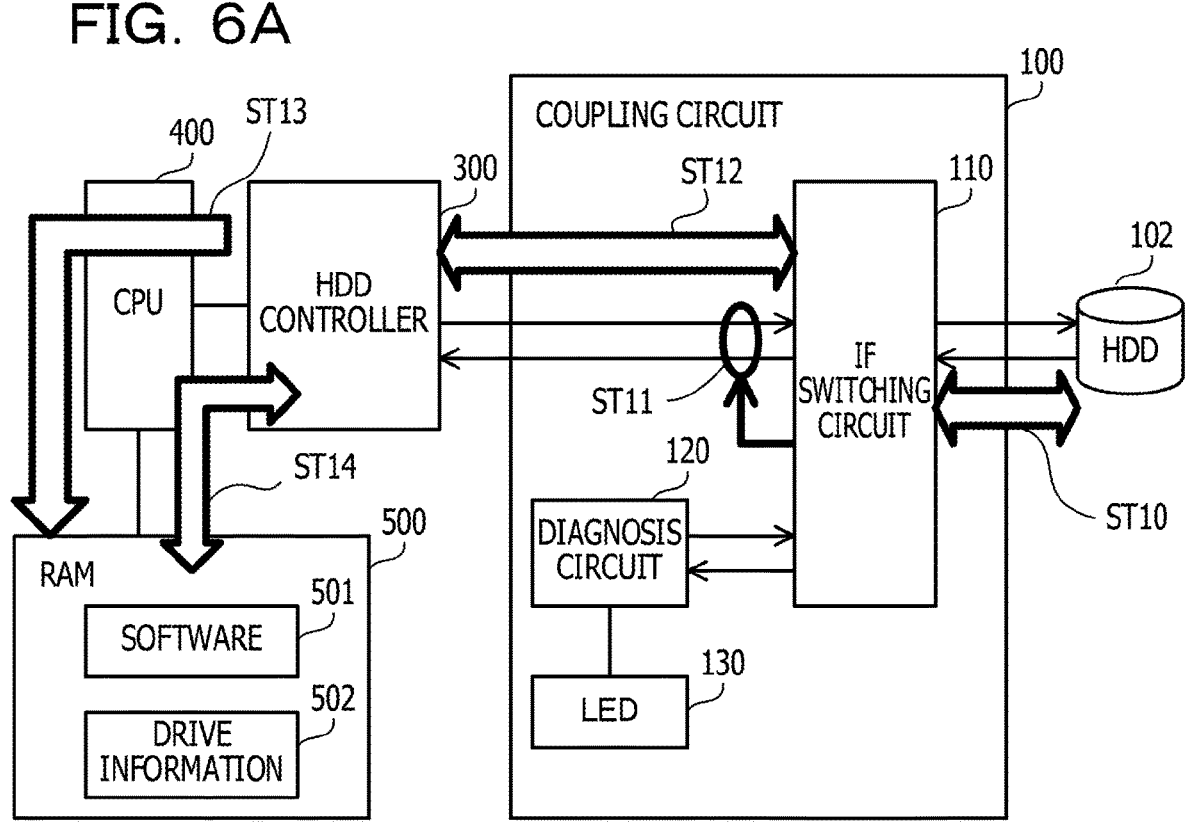
FIGS. 6A and 6B are views depicting examples of control (continuation) of a coupling circuit
Figure 6B:
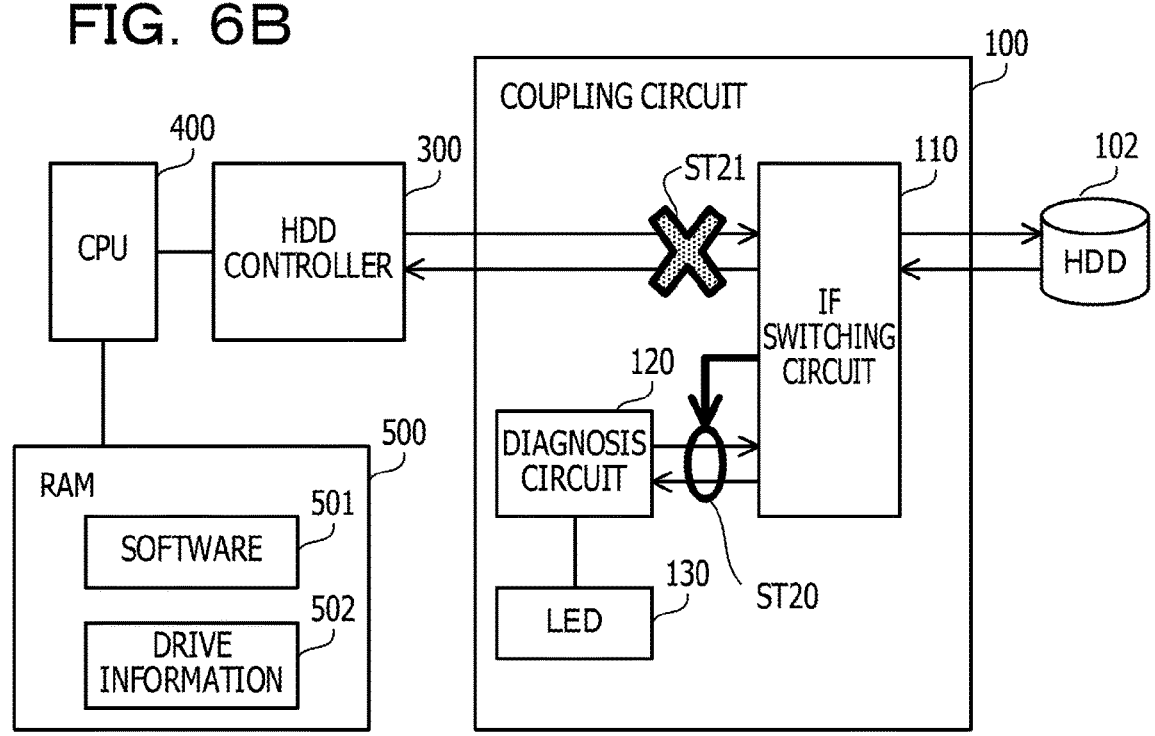

FIGS. 6A and 6B are views depicting an example of control (continuation) of a coupling circuit.

FIG. 6A exemplifies the control example in the case where the diagnosis result of the HDD 102 by the diagnosis circuit 120 is normal.

The IF switching circuit 110 is in a state in which it may receive a signal from the HDD 102 (ST10).

If the diagnosis result of the HDD 102 is normal, the CPU 121 switches the path that couples the diagnosis circuit 120 and the host IF circuit 111 to each other in the interconnect circuit 113 to the path that couples the host IF circuit 111 and the device IF circuit 112 to each other (ST11). As described hereinabove, the switching of the path may be performed by the monitoring circuit 114.

If the monitoring circuit 114 accepts the diagnosis result indicating normality from the CPU 121, it resets the device IF circuit 112. Further, the monitoring circuit 114 changes the enable register 117 from OFF to ON. For example, the state (non-responsive state) in which transmission and reception of a signal to and from the HDD controller 300 are compulsorily stopped is cancelled, and the coupling circuit 100 transits into a responsible state to the HDD controller 300. The device IF circuit 112 starts transmission of a packet indicative of the presence of the HDD 102 in response to the resetting. Since the non-responsive state of the device IF circuit 112 is cancelled, the packet is permitted to arrive at the host IF circuit 310, and the HDD controller 300 recognizes from the reception of the packet that the HDD 102 has been hot-inserted (ST12).

After the HDD controller 300 recognizes the hot-insertion of the HDD 102, it controls the CPU 400 to generate an interrupt for notifying the CPU 400, which executes the software 501, of the hot-insertion of the HDD 102.

After the CPU 400 accepts the interrupt from the HDD controller 300, it instructs the HDD controller 300 to start an initialization sequence for the HDD 102 by a function of the software 501. The HDD controller 300 starts execution of linkup and incorporation, which are the initialization sequence, by setting the control register (for example, "Device Detect Initialize" value) in the inside of the host IF circuit 310 to "1h."

Further, the host IF circuit 310 issues a COMRESET of the SATA to the device IF circuit 112 in accordance with the instruction from the CPU 400. Here, the COMRESET is one of Out Of Band signals of the SATA transmitted from a host to a device and is a RESET signal for the device. After the device IF circuit 112 detects the COMRESET, it notifies the monitoring circuit 114 of detection of the COMRESET.

After the monitoring circuit 114 accepts the notification of the device IF circuit 112, it instructs the host IF circuit 111 to issue the COMRESET to the HDD 102. After the host IF circuit 111 accepts the instruction of the monitoring circuit 114, it issues the COMRESET to the HDD 102 and executes the initialization sequence of the SATA-IF to the HDD 102 again. After the initialization sequence is completed, the host IF circuit 111 notifies the monitoring circuit 114 of the completion of the initialization sequence. The monitoring circuit 114 notifies the device IF circuit 112 of the completion of the initialization sequence by the host IF circuit 111 on the HDD 102 side in response to the notification from the host IF circuit 111. After the device IF circuit 112 accepts the notification of the completion, it replies a COMINIT to the host IF circuit 310, thereby completing the sequence of the initialization sequences after the COMINIT with the host IF circuit 310. Here, the COMINIT is one of Out Of Band signals of the SATA transmitted from a device to a host and is an initialization signal of communication.

After the initialization sequence between the host IF circuit 310 and the device IF circuit 112 is completed, the HDD controller 300 notifies the software 501 executed by the CPU 400 of the completion of the initialization sequence. The software 501 recognizes the mounted state of the HDD 102 and updates the drive information 502 (ST13). The HDD 102 is incorporated into the server apparatus 80 in this manner. Then, the software 501 starts access to the HDD 102 through the HDD controller 300 (ST14). The CPU 400 may perform restore of backup data for the HDD 102, rebuild of the redundant arrays of inexpensive disks (RAID) configuration with the other HDDs and so forth before access by the software 501 is started.

As described above, the IF switching circuit 110 performs an initialization sequence with the HDD 102 before diagnosis, executes the initialization sequence with the HDD 102 again in response to the COMRESET from the host IF circuit 310 and further performs an initialization sequence with the host IF circuit 310.

FIG. 6B exemplifies the control in the case where the diagnosis result of the HDD 102 by the diagnosis circuit 120 is abnormal.

The IF switching circuit 110 is in a state in which it may receive a signal from the HDD 102. If the diagnosis result of the HDD 102 is abnormal, the CPU 121 maintains the path in the interconnect circuit 113, which couples the diagnosis circuit 120 and the host IF circuit 111 to each other. For example, the CPU 121 does not perform switching to the path that couples the host IF circuit 111 and the device IF circuit 112 to each other (ST20).

Further, after the monitoring circuit 114 accepts the diagnosis result indicative of abnormality from the CPU 121, it maintains the enable register 117 in the OFF state. For example, the monitoring circuit 114 maintains the state (non-responsive state) in which transmission and reception of a signal to and from the HDD controller 300 are compulsorily stopped (ST21). For example, the monitoring circuit 114 maintains the notification of the HDD non-mounted state (hot-removed state) to the HDD controller 300.

Therefore, the HDD controller 300 remains recognizing the HDD non-mounted state. Further, also the CPU 400 that executes the software 501 remains without detecting the presence of the HDD 102.

Now, a processing procedure by the IF switching circuit 110 is described.

Figure 7:
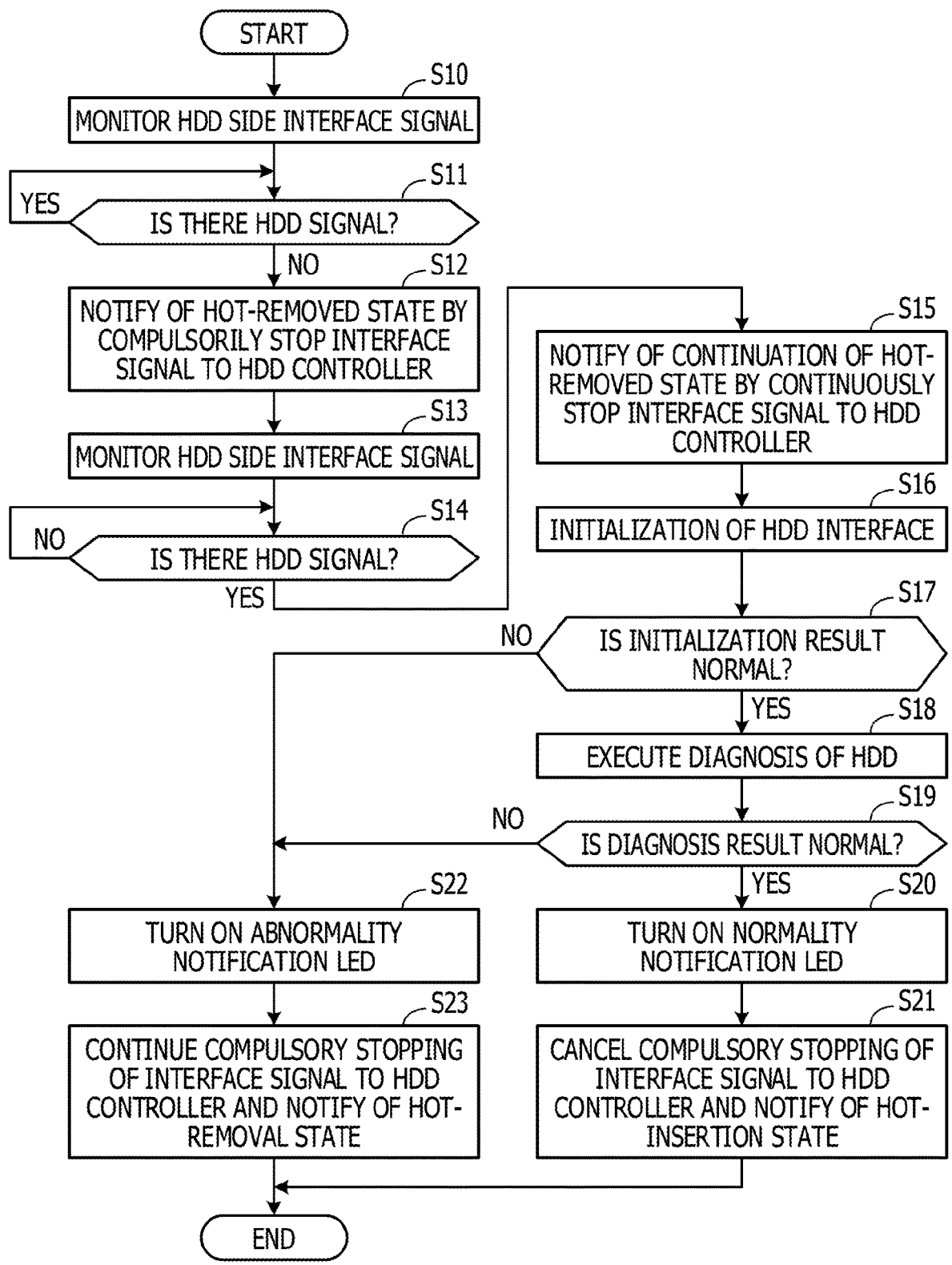
FIG. 7 is a flow chart depicting an example of processing of an IF switching circuit.

FIG. 7 is a flow chart depicting a processing example of an IF switching circuit.

(S10) The monitoring circuit 114 monitors the HDD side interface signal (given HDD signal transmitted by the HDD 101) by monitoring the status information register of the host IF circuit 111.

(S11) The monitoring circuit 114 decides whether or not there is an HDD signal. In the case where there is an HDD signal, the processing advances to S11, in which the monitoring by the monitoring circuit 114 is continued. If there is no HDD signal, the processing advances to S12. For example, in the case where the status information register of the host IF circuit 111 indicates a physically coupled state, the monitoring circuit 114 decides that there is an HDD signal, but in the case where the status information register indicates a physically decoupled state, the monitoring circuit 114 decides that there is no HDD signal. That there is no HDD signal indicates that the HDD 101 has been hot-removed by the user.

(S12) The monitoring circuit 114 compulsorily stops the interface signal to the HDD controller 300 by setting the enable register of the device IF circuit 112 from ON to OFF thereby to notify the HDD controller 300 of the hot-removed state of the HDD 101. Further, the monitoring circuit 114 controls the switching of the path by instructing the diagnosis circuit 120 to perform switching of the path by the interconnect circuit 113. The diagnosis circuit 120 switches the path between the host IF circuit 111 and the device IF circuit 112 to the path between the host IF circuit 111 and the diagnosis circuit 120.

(S13) The monitoring circuit 114 monitors the HDD side interface signal (HDD signal) by monitoring the status information register of the host IF circuit 111.

(S14) The monitoring circuit 114 decides whether or not there is an HDD signal. In the case where there is an HDD signal, the processing advances to S15. In the case where there is no HDD signal, the processing advances to S14, in which the monitoring by the monitoring circuit 114 is continued. For example, in the case where the status information register of the host IF circuit 111 indicates a physically decoupled state, the monitoring circuit 114 decides that there is no HDD signal, but in the case where the status information register of the host IF circuit 111 indicates a physically coupled state, the monitoring circuit 114 decides that there is an HDD signal. That there is an HDD signal indicates that the HDD 102 is hot-inserted.

(S15) The monitoring circuit 114 continuously stops the interface signal to the HDD controller 300 by maintaining the OFF state of the enable register of the device IF circuit 112. Consequently, the monitoring circuit 114 continuously notifies the HDD controller 300 of the hot-removed state.

(S16) The monitoring circuit 114 instructs the host IF circuit 111 to execute an initialization sequence. The host IF circuit 111 performs an initialization sequence for the HDD 102 in accordance with the instruction (initialization of the HDD interface).

(S17) The monitoring circuit 114 decides whether or not a result of the initialization sequence at S16 is normal. In the case where the result of the initialization sequence is normal, the processing advances to S18. However, in the case where the result of the initialization sequence is abnormal, the processing advances to S22.

(S18) The diagnosis circuit 120 executes diagnosis of the HDD 102.

(S19) The diagnosis circuit 120 decides whether or not a result of the diagnosis of the HDD 102 indicates normality. In the case where the result of the diagnosis indicates normality, the processing advances to S20. In the case where the result of the diagnosis does not indicate normality, for example, indicates abnormality, the processing advances to S22.

(S20) The diagnosis circuit 120 causes a normal notification LED of the LED 130 to emit light. The diagnosis circuit 120 performs switching of the path of the interconnect circuit 113. The diagnosis circuit 120 notifies the monitoring circuit 114 of a result of the diagnosis.

(S21) The monitoring circuit 114 resets the device IF circuit 112 to cancel the compulsory stopping of an interface signal to the HDD controller 300 to notify the HDD controller 300 of the hot-inserted state of the HDD 102. Then, the processing is ended.

(S22) The diagnosis circuit 120 causes an abnormal notification LED of the LED 130 to emit light.

(S23) The monitoring circuit 114 continues the compulsory stopping of an interface signal to the HDD controller 300 by maintaining the OFF state of the enable register of the device IF circuit 112 to continuously notify the HDD controller 300 of the hot-removed state. Then, the processing is ended.

After S21, the HDD controller 300 and the coupling circuit 100 execute an initialization sequence for the HDD 102 in accordance with an instruction of the CPU 400 to incorporate the HDD 102 into the server apparatus 80. On the other hand, after S23, the coupling circuit 100 stops the presence detection of the HDD 102 by the HDD controller 300 and performs abnormality notification by the LED 130 to urge the user for replacement of the HDD 102 with an alternative. If the coupling circuit 100 detects the hot-removal of the HDD 102 by the user and detects the hot-insertion of an alternative HDD, the coupling circuit 100 performs diagnosis of the HDD. In the meantime, the coupling circuit 100 remains in compulsory stopping of signal transmission and reception to and from the HDD controller 300.

Now, an example of the initialization sequence in the case where the coupling circuit 100 is used is described. First, a communication path in which the coupling circuit 100 is interposed is exemplified.

Figure 8:
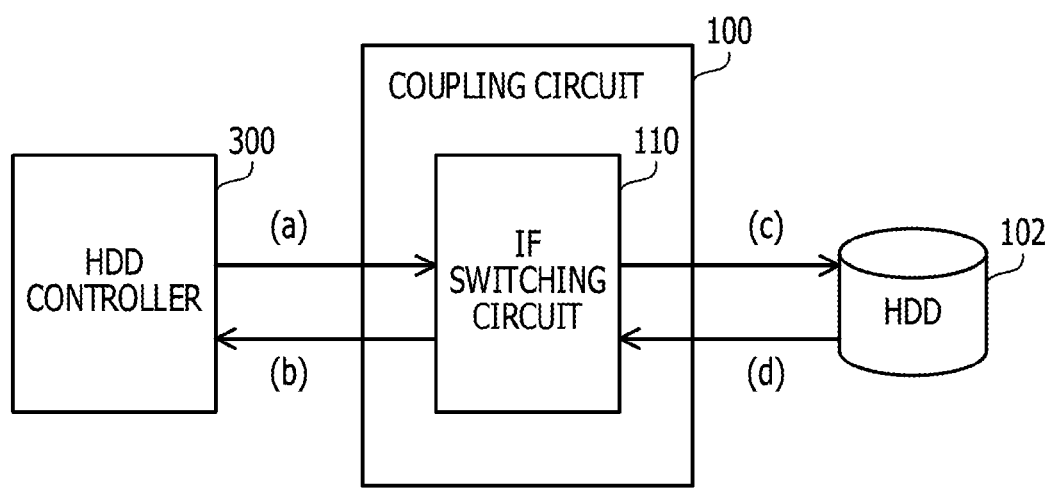
FIG. 8 is a view depicting an example of a communication path through a coupling circuit.

FIG. 8 is a view depicting a communication path in which a coupling circuit is interposed.

As described hereinabove, the HDD controller 300 and the IF switching circuit 110 have two signal paths for transmission/reception therebetween. Further, the IF switching circuit 110 and the HDD 102 have two signal paths for transmission/reception therebetween. The signal path from the HDD controller 300 toward the IF switching circuit 110 is referred to as path (a). The signal path from the IF switching circuit 110 toward the HDD controller 300 is referred to as path (b). The signal path from the IF switching circuit 110 toward the HDD 102 is referred to as path (c). The signal path from the HDD 102 toward the IF switching circuit 110 is referred to as path (d).

Figure 9:
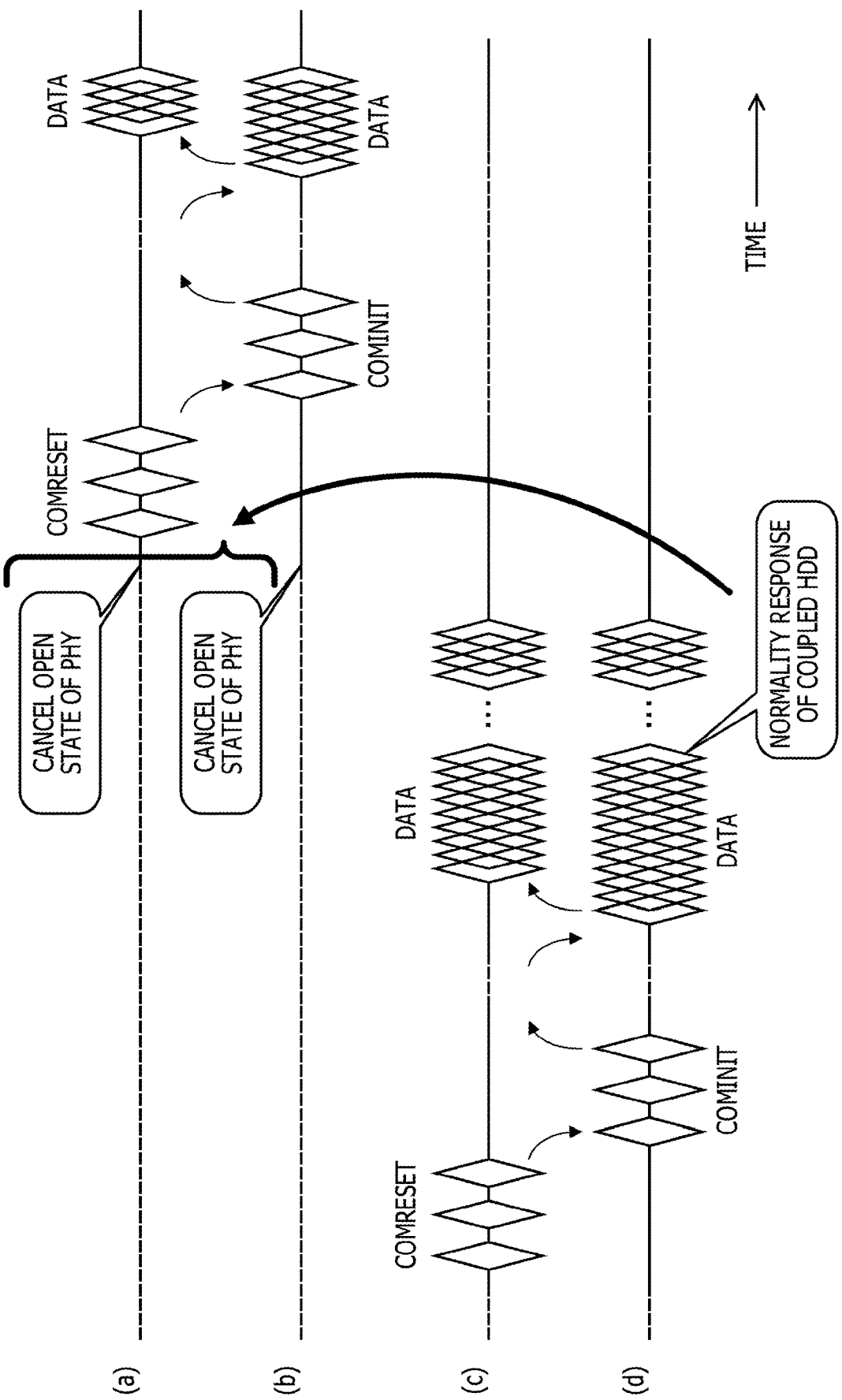
FIG. 9 is a view depicting an example (in a normal case) of an initialization sequence.

FIG. 9 is a view depicting an example (in a normal case) of an initialization sequence.

Hot-removal of the HDD 101 has been performed for the server apparatus 80 and the paths (a) and (b) are in an open state (state in which signal transmission and reception are compulsorily stopped).

Before diagnosis by the diagnosis circuit 120 is performed, the IF switching circuit 110 transmits a COMRESET to the hot-inserted HDD 102 through the path (c). The HDD 102 responds to a COMINIT to the COMRESET through the path (d), and thereafter, a plural number of times of transmission and reception of a given signal are performed to execute an initialization sequence between the IF switching circuit 110 and the HDD 102. If the initialization sequence is completed normally, diagnosis of the HDD 102 by the diagnosis circuit 120 is performed. In the example of FIG. 9, since the response of the HDD 102 is a normal response, the IF switching circuit 110 cancels the open state of the PHY (paths (a) and (b)) on the HDD controller 300 side.

Thereafter, the HDD controller 300 transmits the COMRESET to the IF switching circuit 110 through the path (a). The IF switching circuit 110 replies a COMINIT to the COMRESET through the path (b), and thereafter, a plural number of times of transmission and reception of a given signal are performed to execute an initialization sequence between the HDD controller 300 and the IF switching circuit 110. If the initialization sequence is completed normally, access to the HDD 102 relating to the user data is started.

Within a period after the COMRESET is transmitted to the IF switching circuit 110 through the path (a) until the IF switching circuit 110 replies the COMINIT through the path (b), the IF switching circuit 110 executes the initialization sequence for the HDD 102 again.

Figure 10:
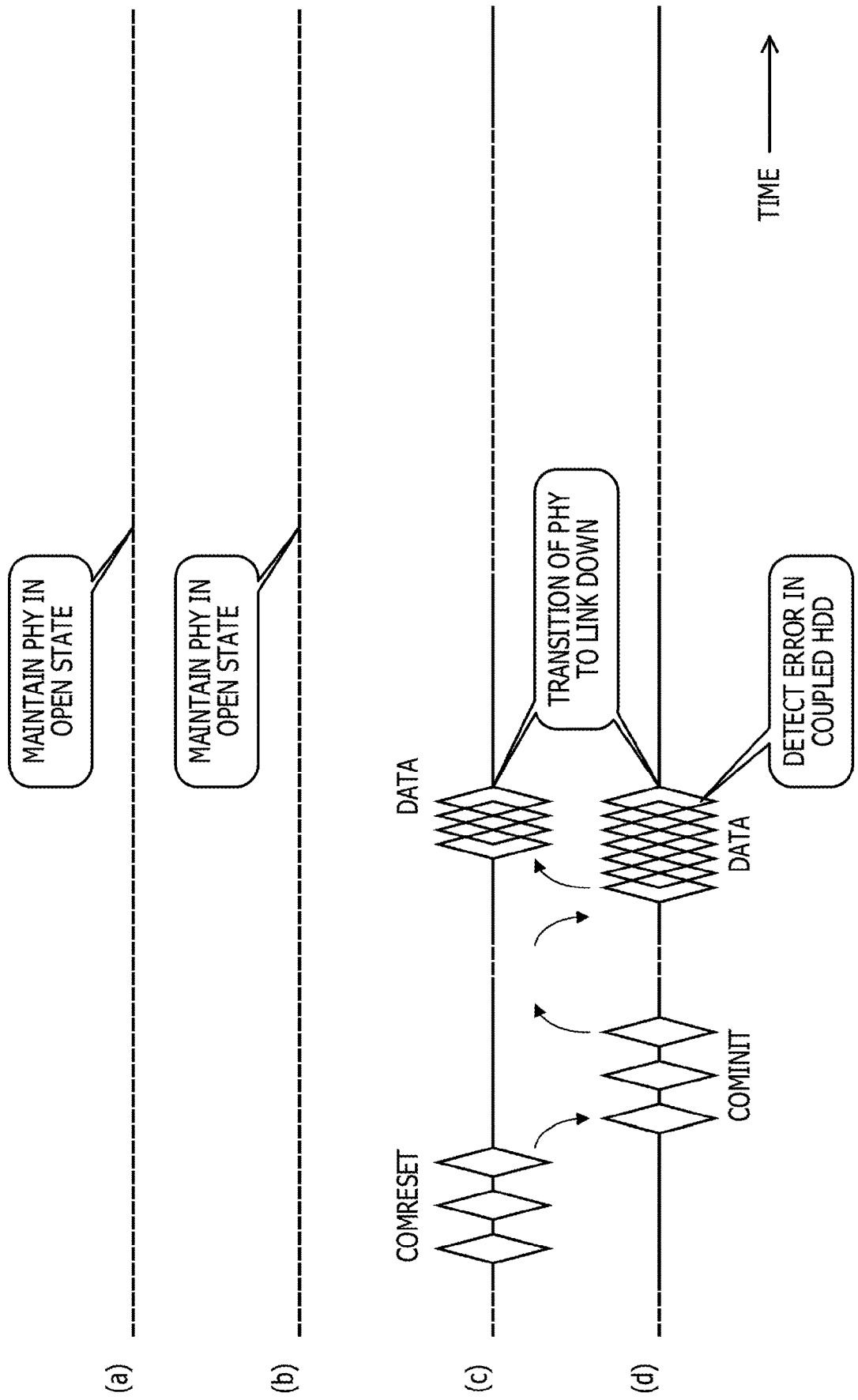
FIG. 10 is a view depicting another example (in an abnormal case) of an initialization sequence.

FIG. 10 is a view depicting an example (in an abnormal state) of an initialization sequence.

The hot-removal of the HDD 101 has been performed for the server apparatus 80 and the paths (a) and (b) are in an open state (state in which signal transmission and reception are compulsorily stopped).

Before diagnosis by the diagnosis circuit 120 is performed, the IF switching circuit 110 transmits a COMRESET to the hot-inserted HDD 102 through the path (c). The HDD 102 replies a COMINIT to the COMRESET through the path (d), and thereafter, a plural number of times of transmission and reception of a given signal are performed to execute an initialization sequence between the IF switching circuit 110 and the HDD 102. If the initialization sequence is completed normally, the diagnosis of the HDD 102 by the diagnosis circuit 120 is performed. In the example of FIG. 10, the response of the HDD 102 upon diagnosis is an abnormality response, and the IF switching circuit 110 detects an error in the HDD 102. For example, the IF switching circuit 110 causes the PHY (physical layer) of the paths (c) and (d) to link down. In this case, the IF switching circuit 110 maintains the PHY (paths (a) and (b)) on the HDD controller 300 side in the open state.

Now, a comparative example in which the HDD 101, 102, 201, . . . is coupled to the HDD controller 300 without the intervention of the coupling circuit 100.

Figure 11A:
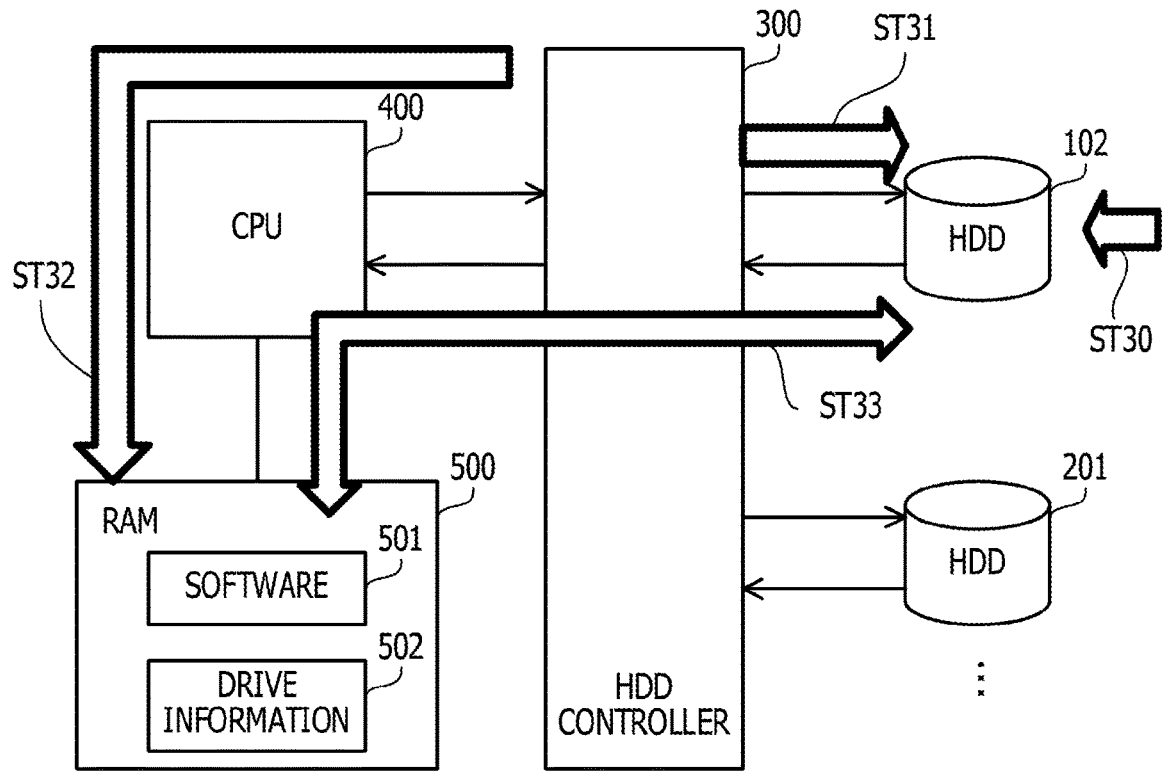
FIGS. 11A and 11B are views depicting comparative examples of control upon insertion of an HDD.
Figure 11B:
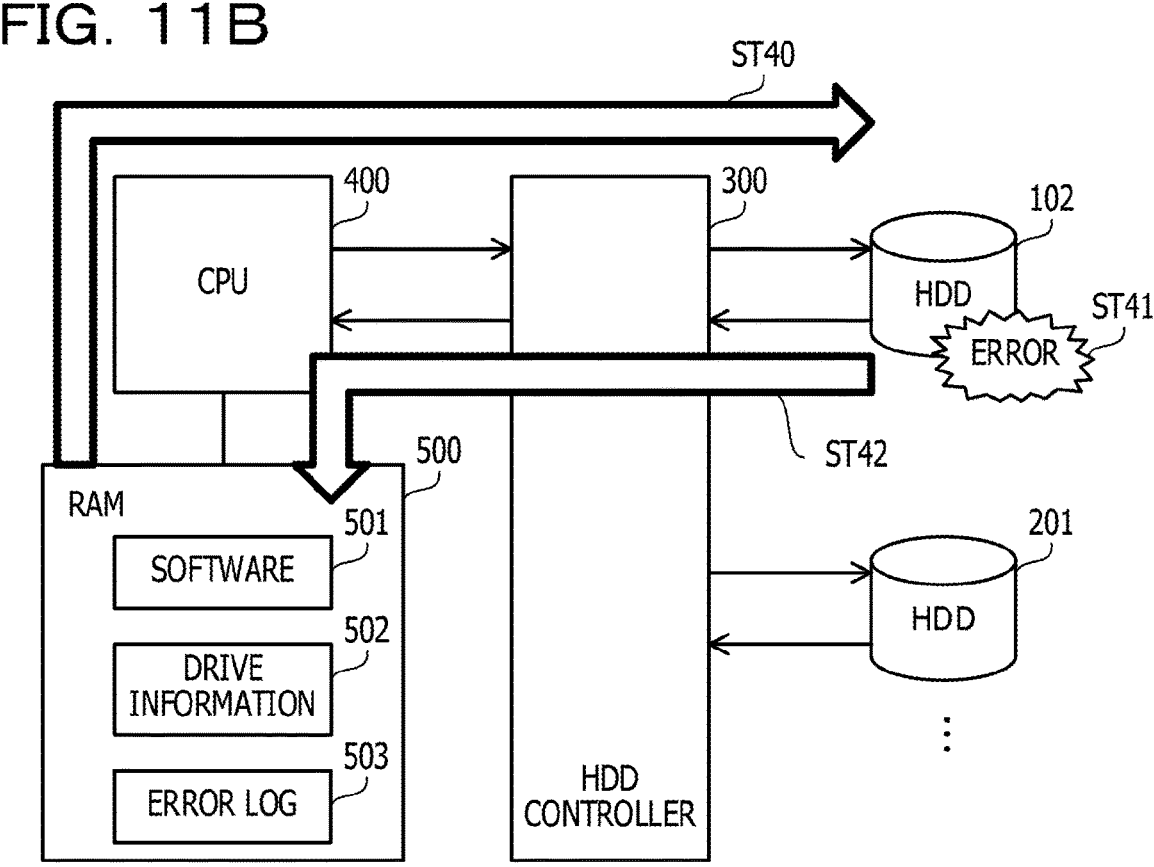

FIGS. 11A and 11B are views depicting comparative examples of control upon insertion of an HDD.

FIG. 11A depicts a comparative example of control upon hot-insertion of the HDD 102.

First, the user would hot-remove the HDD 101 from the HDD controller 300 and hot-insert the HDD 102 in place of the HDD 101 into the HDD controller 300. Hereupon, the power supply to the HDD 102 is made available (ST30).

After the power supply to the HDD 102 is made available, if the HDD controller 300 recognizes insertion of the HDD 102, it executes an initialization sequence to confirm the connectability to the HDD 102 (ST31).

If the initialization sequence is completed normally, the HDD controller 300 issues an interrupt notification of the hot-insertion of the HDD 102 to the CPU 400 that executes the software 501 (ST32).

The CPU 400 accesses the HDD 102 through the HDD controller 300 to recognize the mounted state of the HDD 102, collects HDD information from the HDD 102, and updates the drive information 502 stored in the RAM 500. The incorporation of the HDD 102 is completed therewith. Thereafter, the CPU 400 performs restore of backup data and rebuild of the RAID configuration for the HDD 102 by functions of the software 501 and starts access to the HDD 102 relating to the user data (ST33).

However, if the HDD 102 has an initial failure, deterioration of the system performance is caused by the initial failure.

FIG. 11B depicts a comparative example of control upon occurrence of an error arising from an initial failure of the HDD 102.

First, similarly as in the case of FIG. 11A, the user would hot-remove the HDD 101 from the HDD controller 300 and hot-insert the HDD 102 in place of the HDD 101 into the HDD controller 300. Hereupon, the power supply to the HDD 102 is made available. Then, if an initialization sequence for the HDD 102 ends normally, the HDD controller 300 interrupt notifies the CPU 400, which executes the software 501, of the hot-insertion of the HDD 102.

Thereafter, the CPU 400 performs a process for incorporating the HDD 102 or performs access to the HDD 102 that is practically used after the incorporation (ST40). At this time, an access abnormality to the HDD 102 occurs (ST41). A notification of the access abnormality to the HDD 102 is issued to the CPU 400 (ST42).

The CPU 400 recognizes the abnormality of the HDD 102 by a function of the software 501 and continues the practical use by performing retry. If the retry occurs frequently and the CPU 400 detects deterioration of the system performance, it performs a decoupling process for the HDD 102 and outputs an access log to the HDD 102 or an error log 503 including an error message to the RAM 500. The user would confirm the error log 503 and performs a work for finding out a suspected place. If the user discovers the error of the HDD 102, the user would further perform a work for replacing the HDD 102 with a further HDD.

As in the case of the comparative example of FIG. 11, if the HDD 102 is coupled to the HDD controller 300 and the power supply to the HDD 102 is made available, the HDD 102 continuously performs packet transmission indicative of the presence of the HDD 102 such that the HDD controller 300 detects the presence of the HDD 102. In the comparative example of FIG. 11, even if a failure that is detected as an access abnormality to the HDD 102 is inherent to the HDD 102, there is no mechanism for compulsorily stopping the packet transmission. Therefore, the host side that receives the packet comes to recognize the presence of the HDD 102 having an initial failure. Since incorporation into the system is performed by the host side (CPU 400) at the point of time at which the presence of the hot-inserted HDD 102 is recognized, there is a problem that an initial failure of the HDD 102 is detected after its incorporation is completed and operation is started.

Therefore, the coupling circuit 100 is provided between the HDD controller 300 and the HDD 101 (or the HDD 102). An independent circuit for diagnosis (coupling circuit 100) diagnoses the hot-replaced HDD 102 and suppresses incorporation of the faulty produce into the system, performance deterioration or system down by frequent occurrences of retry that occurs when a faulty product is incorporated may be suppressed.

Further, since the coupling circuit 100 performs diagnosis of the HDD 102, the diagnosis of the HDD 102 may not be performed from software that has the diagnosis function of the HDD 102, and surplus load originating from the diagnosis is not applied to the server apparatus 80 in operation.

An obstacle in the case where a device part such as an HDD is hot-replaced may be suppressed. For example, prior to the diagnosis, the IF switching circuit 110 blocks the signal path to the HDD controller 300 such that the HDD controller 300 does not participate in the diagnosis. Therefore, the influence of the diagnosis on the HDD controller 300 or the CPU 400 and the influence upon the HDD controller 300 and the CPU 400 in case of the HDD 102 has an initial failure may be suppressed.

For example, in the case where it is decided by the diagnosis that the HDD 102 is normal, the IF switching circuit 110 enables detection of the presence of the HDD 102 by the HDD controller 300. On the other hand, in the case where it is decided by the diagnosis that the HDD 102 is abnormal, the IF switching circuit 110 suppresses detection of the presence of the HDD 102 by the HDD controller 300. Consequently, only the HDD 102 where it is free from an initial failure (or low in possibility of an initial failure) may be incorporated into the server apparatus 80, and the possibility that performance deterioration of the server apparatus 80 arising from an initial failure of the HDD 102 may occur may be reduced.

Further, by additionally providing a formatting function of the HDD 102 to the coupling circuit 100, at the point of time at which the software 501 recognizes the HDD 102 after the HDD 102 is hot-inserted, the HDD 102 may be in a formatted state. Therefore, also it is possible to start utilization of the HDD 102 rapidly.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
an interface switching circuit including a first hardware interface to which a first device part is coupled; and
a first processor including a second hardware interface, wherein
the interface switching circuit is configured to:
block, when it is detected that the first device part is removed from the information processing device while the information processing device is operating, a signal path between the first hardware interface and the second hardware interface;
diagnose, when it is detected that the second device part is newly attached to the information processing device while the information processing device is operating, whether the second device part has an initial failure;
cancel, when it is diagnosed that the second device part does not have the initial failure, the blocking of the signal path; and
the first processor is configured to:
detect presence of the second device part by transition of the interface switching circuit from a non-responsive state to a responsible state by the cancelling; and
execute an initialization process for the second device part.

2. The information processing apparatus according to claim 1, wherein the interface switching circuit includes
a third hardware interface coupled to the second hardware interface, and
the interface switching circuit is configured to
block the signal path by stopping communication between the third hardware interface and the second hardware interface.

3. The information processing apparatus according to claim 2, further comprising:
a diagnosis circuit coupled to the interface switching circuit and configured to perform diagnosis of the second device part, wherein
the interface switching circuit is configured to
switch, after the signal path is blocked, a path that couples the first hardware interface and the third hardware interface to a path that couples the first hardware interface and the diagnosis circuit.

4. The information processing apparatus according to claim 1, wherein the interface switching circuit is configured to:
cancel the blocking of the signal path when the result of the diagnosis indicates normality; and
maintain the blocking of the signal path when the result of the diagnosis indicates abnormality.

5. The information processing apparatus according to claim 1, further comprising:
a diagnosis circuit that includes a processor configured to access the second device part,
wherein the processor is configured to:
receive, when presence of the second device part is detected by a monitoring circuit, an interrupt from the monitoring circuit, and
execute the initialization process in accordance with an instruction for initialization included in the interrupt.

6. A control method executed by an information processing apparatus that includes an interface switching circuit and a first processor, the interface switching circuit including a first hardware interface coupled to a first device part, the first processor including a second hardware interface, the control method comprising:
blocking, when it is detected that the first device part is removed from the information processing device while the information processing device is operating, a signal path between the first hardware interface and the second hardware interface by the interface switching circuit;
diagnosing, when it is detected that the second device part is newly attached to the information processing device while the information processing device is operating, whether the second device part has an initial failure;
cancelling, when it is diagnosed that the second device part does not have the initial failure, the blocking of the signal path;
detecting presence of the second device part by transition of the interface switching circuit from a non-responsive state to a responsible state by the cancelling; and
executing an initialization process for the second device part.

7. The control method according to claim 6, wherein
the interface switching circuit includes a third hardware interface coupled to the second hardware interface, and
the blocking includes blocking the signal path by stopping communication between the third hardware interface and the second hardware interface.

8. The control method according to claim 6, further comprising after the signal path is blocked, switching, by the interface switching circuit, a path that couples the first hardware interface and a third hardware interface to a path that couples the first hardware interface and a diagnosis circuit, the diagnosis circuit being coupled to the interface switching circuit and configured to perform diagnosis of the second device part.

9. The control method according to claim 6, wherein
the canceling includes canceling the blocking of the signal path when the result of the diagnosis indicates normality, and
the control method further comprising
maintaining the blocking of the signal path when the result of the diagnosis indicates abnormality.

10. The information processing apparatus according to claim 1, wherein the initialization process includes a linkup and a process for incorporation into the information processing apparatus.

* * * * *